April 14, 1953 D. W. DRYG 2,634,617
GYRATORY DRIVE FOR SIFTERS
Filed Dec. 9, 1950 4 Sheets—Sheet 1

INVENTOR:-
DONALD W. DRYG
BY William C. Babcock
ATTORNEY

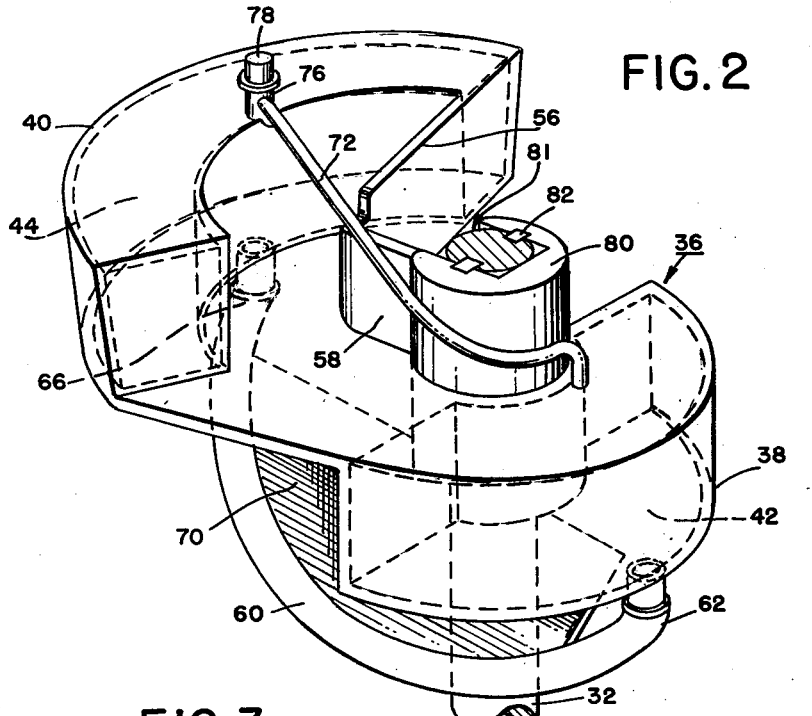
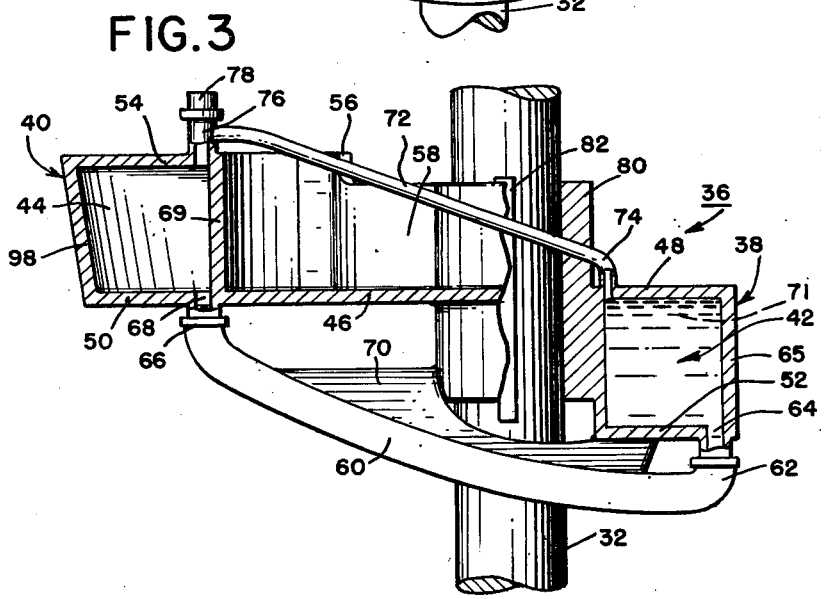

April 14, 1953  D. W. DRYG  2,634,617
GYRATORY DRIVE FOR SIFTERS
Filed Dec. 9, 1950  4 Sheets-Sheet 3

INVENTOR
DONALD W. DRYG
BY William C. Babcock
ATTORNEY

April 14, 1953                D. W. DRYG                2,634,617
                        GYRATORY DRIVE FOR SIFTERS
Filed Dec. 9, 1950                                    4 Sheets-Sheet 4

INVENTOR.-
DONALD W. DRYG
BY William C. Babcock
                ATTORNEY

Patented Apr. 14, 1953

2,634,617

UNITED STATES PATENT OFFICE 2,634,617

GYRATORY DRIVE FOR SIFTERS

Donald W. Dryg, Minneapolis, Minn., assignor to General Mills, Inc., a corporation of Delaware Application December 9, 1950, Serial No. 200,047

17 Claims. (Cl. 74—87)

This application relates to gyratory drives and more particularly to an improved gyratory drive in which the unbalanced weight includes a fluid.

Various gyratory drives are known in which weights are eccentrically located on a rotatable shaft so that rotation of the shaft and weight will cause gyration of the shaft and any members carried thereby, about an axis between the shaft and weights. One application of such devices is in the flour milling field where gyratory drives are currently employed in the operation of sifters. In starting such sifters, difficulties have been encountered with rather severe conditions of vibration during the period in which the gyratory drive is reaching the desired operating speed. These undesirable vibration problems have been substantially eliminated or minimized in some cases by the incorporation of movable weights in the gyratory drive, so arranged that the weights will be balanced with respect to the shaft when the latter is at rest, but will move to an unbalanced condition when a predetermined shaft speed is reached. Since the weights are relatively heavy, the problem of mounting such weights so that they would be movable and yet would be safely retained on the shaft at operating speeds has complicated the production of satisfactory drives.

With these problems of the prior art in view, it is accordingly one object of the present invention to provide an improved gyratory drive.

A further object is the provision of a gyratory drive in which the gyratory mass is shifted from a balanced to an unbalanced condition without the use of movably mounted weights.

Still another object is the provision of a gyratory drive in which a relatively heavy fluid serves as the unbalanced mass.

Still another object is the provision of a gyratory drive in which a heavy fluid is retained in a position of balance or equilibrium until a predetermined speed of shaft rotation is reached, after which the fluid shifts to an unbalanced position to produce the desired gyrations.

A further object is the provision of a gyratory drive including essentially two chambers on a rotatable shaft, with means connecting the chambers for transfer of fluid therebetween to produce balanced and unbalanced conditions of rotation at various shaft speeds.

Other objects and advantages of the invention will be apparent from the following specification in which certain preferred embodiments have been described.

In the drawings accompanying this application and in which like reference characters indicate like parts, Figure 1 is a perspective view of a gyratory sifter incorporating a drive according to the present invention.

Fig. 2 is an enlarged perspective view of the gyratory drive of Fig. 1.

Fig. 3 is a sectional view of the device of Fig. 2.

Figure 1:
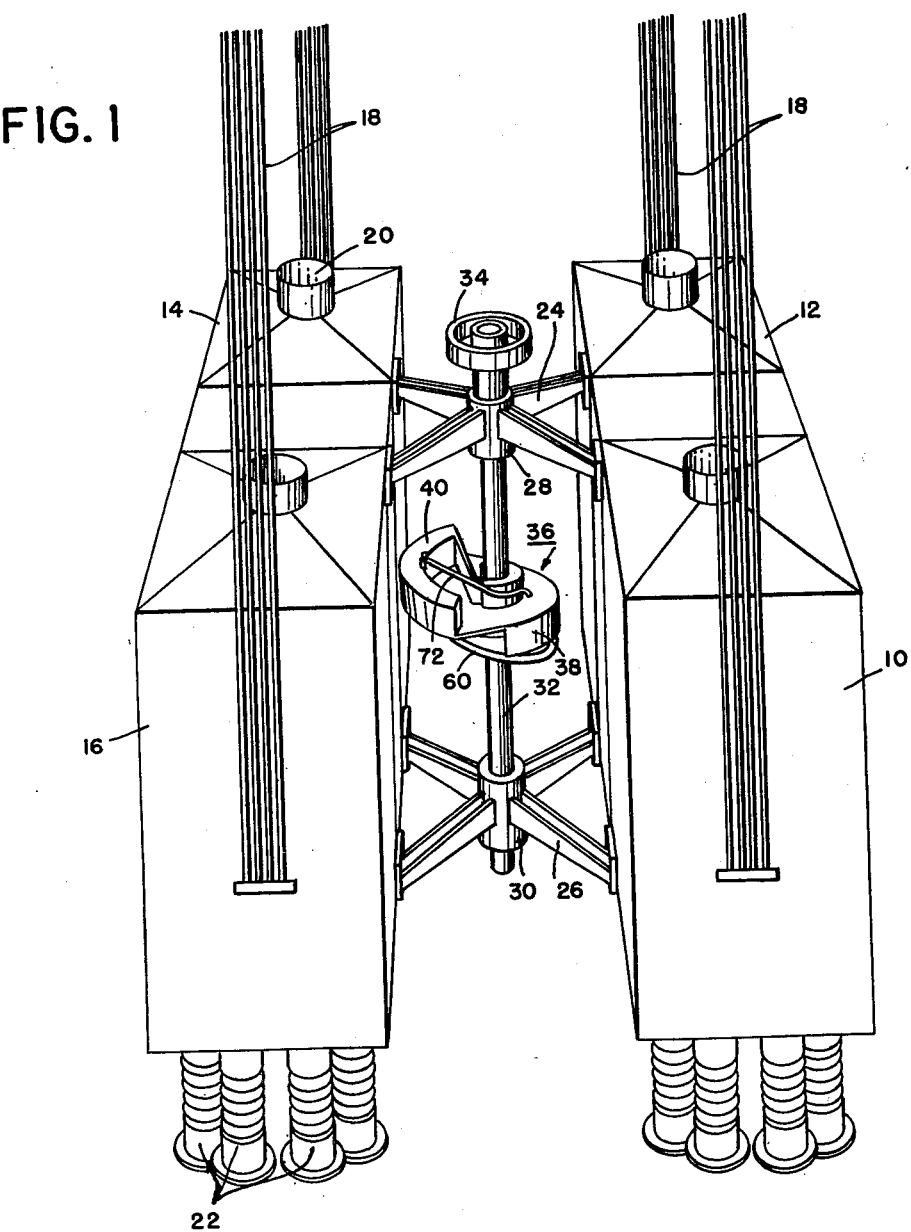

As shown in Fig. 1 the sifter includes four units 10, 12, 14, and 16, respectively, which are oriented at substantially the corners of a square. These sifter units are suspended from the ceiling or building structure by resilient rods 18 in known manner. Each sifter unit includes an inlet 20 for the material to be classified, as well as a plurality of outlets 22 for the different grades of material.

The four sifter units are interconnected by upper and lower frame members 24 and 26, respectively. Upper frame member 24 has a bearing portion 28 and lower frame member 26 has a vertically aligned bearing portion 30. Rotatably supported in the aligned bearing portions 28 and 30 is a rotatable vertically extending shaft 32. At its upper end shaft 32 carries a pulley 34 which is rotatably driven in known manner at the desired speed.

Mounted on the rotatable shaft 32 at substantially the center of gravity of the system is the gyratory unit generally indicated at 36. It will be understood that a single unit has been illustrated at the center of gravity of the system although it is also customary to utilize two of such units, one at the upper end and one at the lower end of shaft 32, in certain applications.

The particular gyratory drive unit is illustrated more fully in Figs. 2 and 3. For example, the unit includes one or more castings or receptacles 38 and 40 which provide first and second chambers 42 and 44, respectively. It will be noted that chamber 42 is lower than chamber 44 on the vertical axis of shaft 32 and that the first chamber 42 is also closer to the axis of the shaft than is the second chamber 44.

For convenience, a common horizontal wall member 46 may be provided, one portion of the wall at 48 serving as the top of the first chamber 42, while another portion of the wall at 50 serves as the bottom of chamber 44. Spaced below the wall portion 48 is the lower wall member 52 which serves as the bottom of chamber or receptacle 42. Spaced above the wall portion 50 is another wall portion 54 which serves as the top of chamber 44. Suitable reinforcing ribs 56 and 58 may be provided to strengthen the construction and insure the necessary rigidity of the chambers or receptacles with respect to the shaft.

Connecting the first and second chambers 42 and 44 is a conduit 60. The first end 62 of this conduit opens at 64 into the bottom of the first chamber immediately adjacent the outer wall 65 thereof.

The second end 66 of conduit 60 opens at 68 into the bottom of the second chamber 44. This opening 68 is located immediately adjacent the inner wall 69 of the second chamber.

The point of opening 64 is closer to the axis of rotation of shaft 32 than is the opening 68. Furthermore, the conduit 60 is supported at its intermediate portions by a reinforcing web 70 which holds the conduit in a spiral and helical configuration with respect to shaft 32 so that from the first end 62 to the second end 66, each successive portion of the conduit 60 is at a slightly greater elevation and slightly greater distance from shaft 32.

As a result of the relative orientation of the parts, it will be apparent that a fluid 71, which is preferably a relatively heavy liquid such as mercury, will normally remain in the first chamber 42 when the shaft 32 is at rest or is rotated below a predetermined speed. If, however, the shaft 32 and assembled chambers are rotated above a predetermined speed, the effect of centrifugal force on the liquid 71 will urge it through the opening 64 from the first end to the second end of conduit 60 and thus into the second chamber or receptacle 44.

To facilitate this shifting of the fluid from one chamber or receptacle to the other, it is preferable (particularly where a closed system is utilized) to provide additional conduit means, shown at 72 for air communication between the two receptacles at a point above the normal liquid level of each chamber. Thus one end 74 of second conduit 72 opens into the upper wall portion 48 of the first chamber 42. At the same time the second end 76 of the additional conduit 72 opens into the upper wall portion 54 of second chamber 44. A removable filler plug 78 is provided at this latter point of connection in order that the amount of heavy fluid within the system may be changed or adjusted in any desired manner.

The gyratory drive assembly includes a central hub portion 80 open on one side 81 and keyed at 82 to the shaft 32 in order that the two chambers of the system will be firmly fixed with respect to the shaft and will rotate with the shaft at all times. The entire unit may be easily removed from the shaft by removing the keys 82 and moving the unit so the shaft passes through the opening 81.

Figure 4:
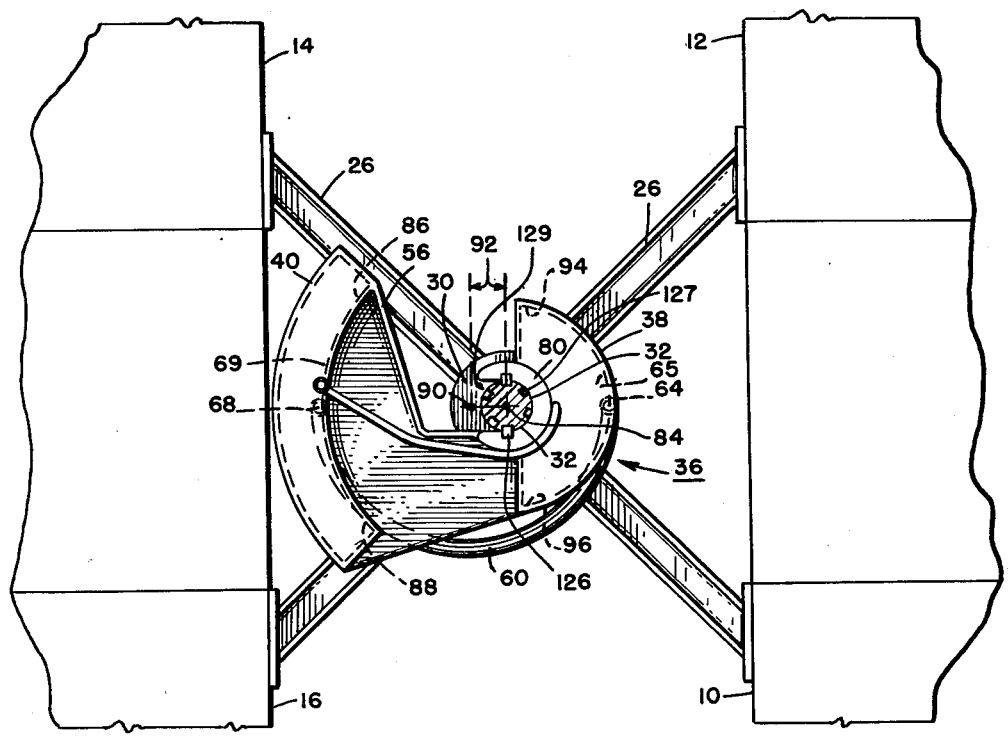
Fig. 4 is a top view of the sifter of Fig. 1 with certain portions broken away and shown in section to illustrate the connection of the gyratory drive to the shaft.

The thickness of the material which forms the respective first and second receptacles, and their relative radial distances from the shaft 32 are so chosen, within the scope of the design limitations already noted, that the first receptacle, with the heavy fluid which it contains when the drive is at rest, will substantially balance the weight of the empty second chamber and its supporting parts. Thus upon initial rotation of shaft 32 the effective moment of the two receptacles will be equal and will offset each other so that there is no tendency to produce gyrations during the starting of the device. Once a predetermined speed is reached, however, the transfer of fluid 71 from the first to the second receptacle will increase both the mass and the effective moment of the second receptacle so that the entire unit will cease to rotate about the central axis 84 of shaft 32 (Fig. 4), and will tend to gyrate about a new axis indicated at 90. This axis of desired gyration will be parallel to the central axis 84 of shaft 32 and will be displaced from it toward the effective center of mass of the second receptacle 40. The displacement between the shaft axis and the axis of gyration is indicated at 92 in Fig. 4.

As shown in this figure, both the first and second chambers or receptacles are of substantially annular configuration. It should be noted that the inner wall 69 of the second receptacle 40 extends substantially circumferentially in both directions from the point of connection 68 with conduit 60. The respective ends of this inner wall portion 69 are indicated at 86 and 88.

In order to facilitate the smooth flow of fluid from one receptacle to the other by keeping the end 76 of the air conduit free from fluid, the inner wall portion 69 should be located progressively farther away from the desired axis of gyration 90 as the wall extends from the opening 68 toward the respective ends 86 and 88. One way of achieving this result is by making the wall 69 in the form of a curve having its center at the shaft axis 84.

Similarly, to facilitate the smooth flow of fluid from the first receptacle the outer wall 65 of such receptacle is given a particular configuration. This outer wall extends in both directions circumferentially from the point of connection 64 with conduit 60, the respective ends of the outer wall being indicated at 94 and 96. These extremities or ends of the outer wall are preferably located a lesser radial distance from the desired center of gyration 90 than the radial distance of opening 64 from such axis of gyration. Here again, a convenient way of obtaining the result is to form the wall portion 65 in the shape of a curve centered at the shaft axis 84.

The device of Figs. 1-4, inclusive, accordingly functions to accomplish the objects set forth at the beginning of this specification and provides smooth starting of the gyratory drive due to the balanced moments in the rest position. The change from balanced to unbalanced condition takes place smoothly as a predetermined speed of rotation is reached, with a complete absence of moving parts and shifting rigid weights. Since the fluid within the chambers is the only thing which changes position, and since the chambers can be made of the desired strength to contain the masses involved, the risks of insecure mounting of the shiftable weights of the prior art are substantially avoided. Furthermore, in case of accident to the mechanism, the release of the fluid will cause much less damage, even at high speeds of rotation, than the damage which might be caused by a rigid mass which became detached from the prior art mechanisms at high speed.

Figure 5:
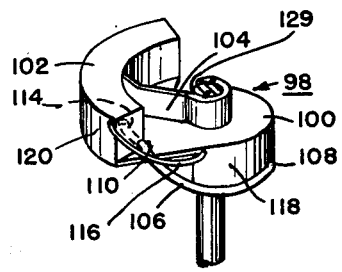
Fig. 5 is a perspective view of a modified embodiment of the invention.

In Fig. 5, a modification of the device of Figs. 1-4 is shown. This gyratory drive is indicated at 99 and includes first and second receptacles 100 and 102, respectively, which are substantially similar to the first and second chambers just described. A reinforcing web 104 extends radially at the center of the device from the second receptacle to the hub portion on the shaft. The chief feature of this embodiment is the arrangement of the main conduit member 106 for transfer of the fluid, and the secondary conduit 116 so that these conduits do not extend above or below the particular receptacles at their points of connection. Thus main conduit 106 has one end 108 connected to the outer wall of first receptacle 100. The second end 110 is connected at one of the ends of second receptacle 102 and extends into the receptacle as shown at 114. As previously mentioned, the distance of point 114 radially from the desired center of gyration and from the axis of the rotary shaft is preferably less than the corresponding distance of any other portion of the inner wall of receptacle 102. The auxiliary conduit for air communication between the receptacles is shown at 116 and has one end connected to the outer wall 118 of the first receptacle and its other end connected to the outer wall 120 of the second receptacle.

Figure 6:
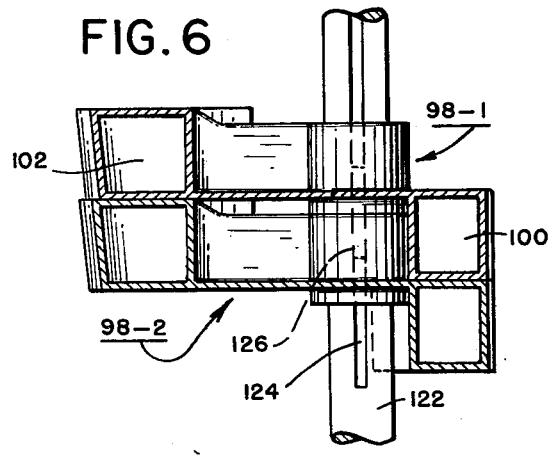
Fig. 6 is a sectional view illustrating the use of a plurality of units of the type previously shown.

Because of the particular conduit locations, it is possible to stack a plurality of gyratory units 98 on a single shaft as shown in Fig. 6. Here the rotary shaft 122 carries two of these units indicated at 98—1 and 98—2. Each unit has the first and second receptacles 100 and 102 and the connections as shown in Fig. 5. It will be noted that these units are stacked immediately adjacent each other vertically of the shaft 122 so that the effective mass of the combined unit can be kept within rather narrow vertical limits due to the conduit arrangement.

The shaft 122 has a relatively long key slot 124 and one or more keys 126 may be used to secure the units 98—1 and 98—2 to the shaft. By providing a plurality of angularly spaced key slots 127 in the shaft it is further possible to adjust the units angularly to different relative circumferential positions with respect to each other and thereby to change the effective mass and the effective radius of gyration for different installations or different applications. The units may be individually removed by removing the keys 126 and moving the unit so that the shaft passes through the opening 129.

Figure 7:
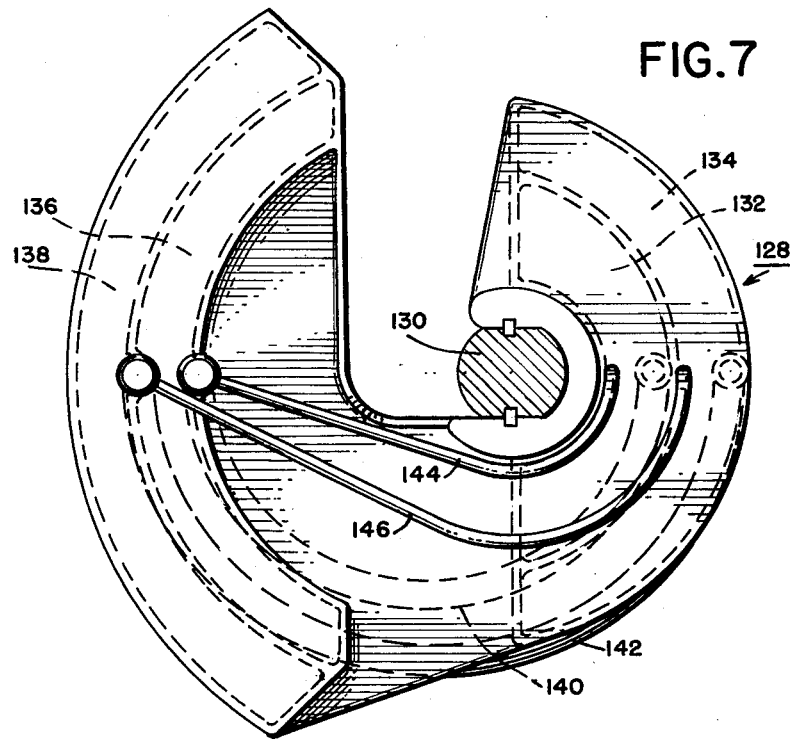
Fig. 7 is a top view of another embodiment of the invention in which a plurality of radially spaced chambers are utilized.
Figure 8:
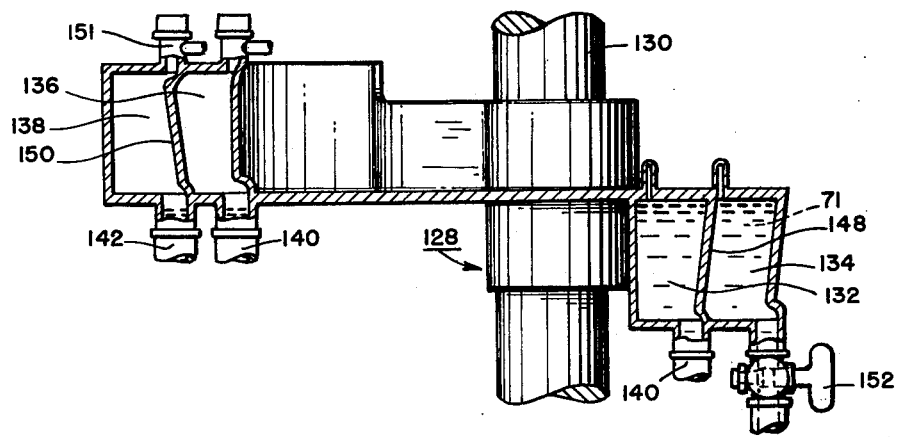
Fig. 8 is a partial sectional view of the device of Fig. 7.

A further embodiment of the present invention is shown in Figs. 7 and 8. Here the gyratory unit is indicated generally at 128 and is keyed on a rotatable shaft 130. The characteristic feature of this embodiment is the provision of a plurality of first chambers and a plurality of second chambers. For example, the unit includes inner and outer first chambers 132 and 134, respectively, and corresponding inner and outer second chambers 136 and 138. The inner chambers are connected by main fluid transfer conduit 140, while the outer chambers are connected by fluid transfer conduit 142. Auxiliary conduits 144 and 146 connect the upper portions of the respective pairs of chambers. The function of each pair of chambers is the same as the function and operation of the single gyratory drive unit described in Figs. 1–4. The coaxial inner and outer chamber arrangement makes it possible to utilize larger quantities of fluid and effect the change from balanced to unbalanced condition within a minimum time after the predetermined speed of rotation is approached.

In order to increase the capacity and efficiency of the device, certain of the walls of the chambers are given particular configurations as shown in Fig. 8. Thus the partition 148 between the inner and outer first chambers 132 and 134 is inclined upwardly and outwardly somewhat more steeply than the slope of the surface at the vortex of a mass of fluid rotating at that radius about a vertical axis at the expected speed of rotation. This will insure that all fluid within the inner first chamber 132 will ultimately be able to pass through the chamber outlet into the conduit 140.

Similarly, the partition 150 between the inner and outer second receptacles 136 and 138 may be inclined somewhat more steeply than the slope of the surface of the vortex of a mass of fluid at that radius rotating at the expected angular velocity. Such an arrangement will insure that the end 151 of the air conduit 146 will remain free when the chamber 138 is substantially filled with fluid.

Increased flexibility of application of the device of Figs. 7 and 8 may be achieved through the provision of one or more valves controlling the conduits 140 and 142. For example, the use of a valve 152 in the conduit 142 makes it possible to prevent transfer of fluid from the receptacle 134 or to permit such transfer selectively as desired by the operator. Thus if a greater effective radius of gyration is desired, the valve 152 can be opened so that fluid passes from both the inner and outer first chambers 132 and 134. On the other hand, if a somewhat smaller radius of gyration is needed for a particular application, the valve can be closed so that fluid will remain in the outer first receptacle 134 and will be transferred only from the inner first receptacle 132.

The provision of such valves also permits some control over the relative rate of transfer of fluid and facilitates the control of vibrations as the speed of shaft 130 increases through particularly troublesome speed ranges.

From the foregoing description it is apparent that a gyratory drive has been provided which accomplishes the objects of the present invention and which offers increased efficiency and flexibility of operation.

Since minor variations and changes in the exact details of construction will be apparent to persons skilled in this field, it is intended that this invention shall cover all such changes and modifications as fall within the spirit and scope of the attached claims.

Now, therefore, I claim:

1. A gyratory drive comprising a rotatable vertical shaft, a pair of fluid chambers mounted on substantially opposite sides of the shaft, with the first chamber lower than the second and spaced closer than the second chamber to the axis of rotation of the shaft, and a conduit having a first end opening into the first chamber and a second end opening into the second chamber for automatic upward transfer of fluid from the first chamber to the second by centrifugal force solely in response to rotation of the shaft at and above a predetermined speed.

2. A gyratory drive according to claim 1 in which the second end of the conduit opens into the bottom of the second chamber at a point higher than the point where the first end of the conduit opens into the first chamber for transfer of fluid by gravity from the second chamber to the first when the shaft speed decreases below said predetermined speed.

3. A gyratory drive according to claim 2 in which the mass of the empty second chamber multiplied by its effective distance from the axis of rotation of the shaft substantially equals and offsets the total mass of the first chamber including a predetermined volume of the fluid therein multiplied by the effective distance of said first chamber and fluid from said axis.

4. A gyratory drive comprising a rotatable vertical shaft, a pair of fluid receptacles mounted on the shaft, means supporting the shaft for rotation on its own axis and for gyrations about a gyratory axis spaced therefrom and parallel thereto, and preventing tilting of the shaft, with the first receptacle lower than the second and having its outer wall spaced closer to the axis of the shaft than the inner wall of the second receptacle, and means providing a conduit connecting said outer wall and said inner wall and automatically transferring fluid from the first receptacle to the second by centrifugal force whenever the shaft is rotated at and above a predetermined speed.

5. A gyratory drive comprising a rotatable vertical shaft, a pair of fluid receptacles mounted on substantially opposite sides of the shaft, with the first receptacle lower than the second and having its outer wall spaced closer to the axis of the shaft than the inner wall of the second receptacle, and a conduit connecting said outer wall and the bottom of said inner wall for transfer of fluid from the first receptacle to the second by centrifugal force when the shaft is rotated at a predetermined speed, said conduit opening into the outer wall at a point below the bottom of said inner wall for transfer of fluid from the second receptacle to the first by gravity when the shaft is at rest.

6. A gyratory drive according to claim 5 in which the desired axis of gyration is between the second receptacle and the axis of the shaft, said outer wall of the first receptacle being radially closer to both the shaft axis and the desired axis of gyration than the inner wall of the second receptacle is.

7. A gyratory drive according to claim 6 in which said inner wall extends substantially circumferentially of the shaft from the point of conduit connection toward at least one end, said inner wall being spaced progressively farther from the desired axis of gyration as it extends away from the point of conduit connection toward said one end.

8. A gyratory drive comprising a rotatable vertical shaft, a pair of fluid receptacles mounted on the shaft with the first receptacle lower than the second receptacle and with both the center of mass and innermost area of the second receptacle located at a greater radial distance from the shaft than the center of mass and outermost area of the first receptacle, a fluid conduit connecting said innermost and outermost areas to each other, and a body of fluid of predetermined volume held by gravity in the first receptacle when the shaft is at rest and adapted to flow through the conduit to the second receptacle by centrifugal force when the shaft is rotated above a given speed, the mass of the first receptacle plus the mass of the fluid therein substantially balancing the mass of the second receptacle with respect to the axis of rotation of the shaft when the shaft is at rest.

9. A gyratory drive comprising a rotatable vertical shaft, a pair of fluid receptacles mounted on the shaft with the first receptacle lower than the second receptacle and with both the center of mass and innermost area of the second receptacle located at a greater radial distance from the shaft than the center of mass and outermost area of the first receptacle, a fluid conduit connecting said innermost and outermost areas to each other, and a body of fluid of predetermined volume held by gravity in the first receptacle when the shaft is at rest and adapted to flow through the conduit to the second receptacle by centrifugal force when the shaft is rotated above a given speed, the mass of the first receptacle plus the mass of the fluid therein substantially balancing the mass of the second receptacle with respect to the axis of rotation of the shaft when the shaft is rotated below said given speed.

10. A drive according to claim 9 including additional conduit means connecting the two receptacles above their respective fluid levels.

11. A gyratory drive comprising a rotatable vertical shaft, a first pair of fluid chambers having a first chamber spaced closer than the second chamber to the axis of rotation of the shaft, a second pair of fluid chambers having a first chamber spaced closer than the second chamber to the axis of rotation of the shaft, a first conduit connecting between said first pair of chambers and transferring fluid from the first to the second by centrifugal force above a predetermined shaft speed, a second conduit connecting between said second pair of chambers and transferring fluid from the first to the second by centrifugal force above a predetermined shaft speed, and manually adjustable fluid flow control means located in one of said conduits, adjustment of said flow control means limiting the transfer of fluid through said one conduit and thereby determining the degree of unbalance of the drive.

12. A gyratory drive comprising a rotatable vertical shaft, a pair of closed fluid chambers mounted on substantially opposite sides of the shaft with the first chamber spaced closer than the second chamber to the axis of rotation of the shaft, a conduit connecting the first chamber to the second chamber and automatically transferring fluid from the first chamber to the second by centrifugal force whenever the shaft is rotated above a predetermined speed, and a second conduit connecting the first chamber to the second chamber for the passage of air to equalize the air pressure in said chambers.

13. A gyratory drive comprising a rotatable vertical shaft, a pair of fluid chambers mounted on the shaft with the first chamber spaced closer than the second chamber to the axis of rotation of the shaft, and a conduit connecting said chambers and automatically transferring fluid from the first chamber to the second by centrifugal force whenever the shaft is rotated above a predetermined speed, said first chamber having an outer wall having a greater slope than the slope at the vortex at that radius of a mass of fluid rotating at said predetermined speed, said conduit being connected to the first chamber at the base of the outer wall.

14. A gyratory drive comprising a rotatable vertical shaft, a pair of fluid closed receptacles mounted on the shaft with the first receptacle spaced closer to the shaft than the second, a conduit connecting said receptacles and automatically transferring fluid from the first receptacle to the second by centrifugal force whenever the shaft is rotated above a predetermined speed, and a second conduit connecting said receptacles for transfer of air for equalization of pressure between receptacles, said second receptacle having an inner wall having a greater slope than the slope at the vortex at that radius of a mass of fluid rotating at said predetermined speed, said second conduit being connected to the second chamber at the top of the inner wall.

15. A gyratory drive for gyration of a rotatable vertical shaft about a desired axis of gyration radially offset from and parallel to the axis of the shaft, said drive comprising means supporting the shaft for said gyration and preventing tilting of the shaft, first and second fluid chambers mounted on the shaft, the first chamber being lower than the second and the second chamber having its center of mass spaced farther from the shaft axis than the center of mass of the first chamber, a body of fluid normally contained in the first chamber when the shaft is rotated below a predetermined speed, the total effective mass of the shaft and drive being substantially balanced with reference to the shaft axis whenever the fluid is in the first chamber, and an open conduit connecting an outer portion of the first chamber and the second chamber, the fluid in said first chamber being automatically transferred upwardly through the conduit to the second chamber by centrifugal force whenever the shaft is rotated at and above said predetermined speed, the total effective mass of the shaft and drive thereby being unbalanced with reference to the shaft axis solely in response to rotation of the shaft at and above said predetermined speed.

16. A gyratory drive for gyration of a rotatable vertical shaft about a desired axis of gyration radially offset from and parallel to the axis of the shaft, said drive comprising means supporting the shaft for said gyration and preventing tilting of the shaft, first and second fluid chambers having their respective centers of mass on opposite sides of the shaft, the center of mass of the first chamber being spaced radially closer than that of the second chamber to the shaft axis and to the axis of gyration, the first chamber being lower than the second chamber, said first chamber having an outlet, and a conduit connecting said outlet and said second chamber and automatically transferring fluid from the first chamber to the second by centrifugal force when the shaft is rotated at and above a predetermined speed, the moment of inertia of said first chamber, when filled with fluid, at least partially counterbalancing the moment of the empty second chamber and thereby minimizing gyrations when the shaft is rotated below said predetermined speed, the automatic transfer of fluid from the first to the second chamber establishing a more unbalanced condition and thereby causing desired gyrations whenever the shaft is rotated at and above said predetermined speed.

17. A gyratory drive for gyration of a rotatable vertical shaft about a desired axis of gyration radially offset from and parallel to the axis of the shaft, said drive comprising means supporting the shaft for said gyration and preventing tilting of the shaft, first and second fluid chambers mounted on the shaft, a body of fluid normally located in the first chamber, and means for transferring the fluid from the first chamber to the second by centrifugal force during rotation of the shaft at and above a predetermined speed, the center of mass of said second chamber being spaced farther than the center of mass of the first chamber from the axis of the shaft, and said fluid having a total mass which, when the fluid is in the first chamber, provides a moment of inertia for the first chamber substantially counterbalancing the moment of inertia of the empty second chamber, thereby maintaining the shaft and drive in balance until said fluid is transferred to the second chamber.

DONALD W. DRYG.

References Cited in the file of this patent

UNITED STATES PATENTS

| Number | Name | Date |
| --- | --- | --- |
| 2,481,174 | Strawn | Sept. 6, 1949 |

FOREIGN PATENTS

| Number | Country | Date |
| --- | --- | --- |
| 51,902 | Germany | July 12, 1889 |